Figures 1, 2:
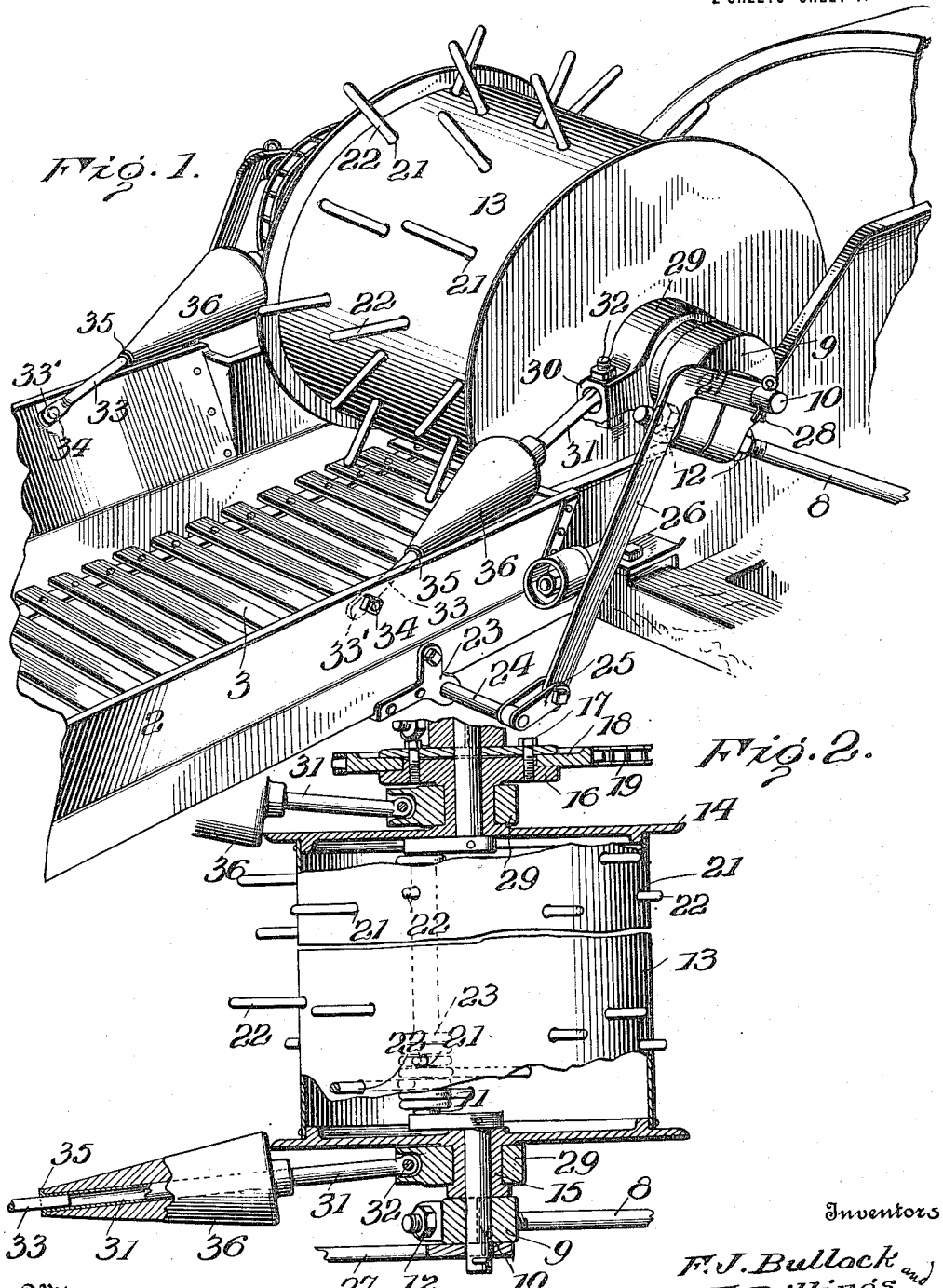

F. J. BULLOCK & F. F. BILLINGS.
FEEDING MECHANISM FOR ENSILAGE CUTTERS.
APPLICATION FILED OCT. 25, 1915.

1,168,932.

Patented Jan. 18, 1916.
2 SHEETS—SHEET 1.

Witnesses.

Inventors
F. J. Bullock and
F. F. Billings.

By

Attorney

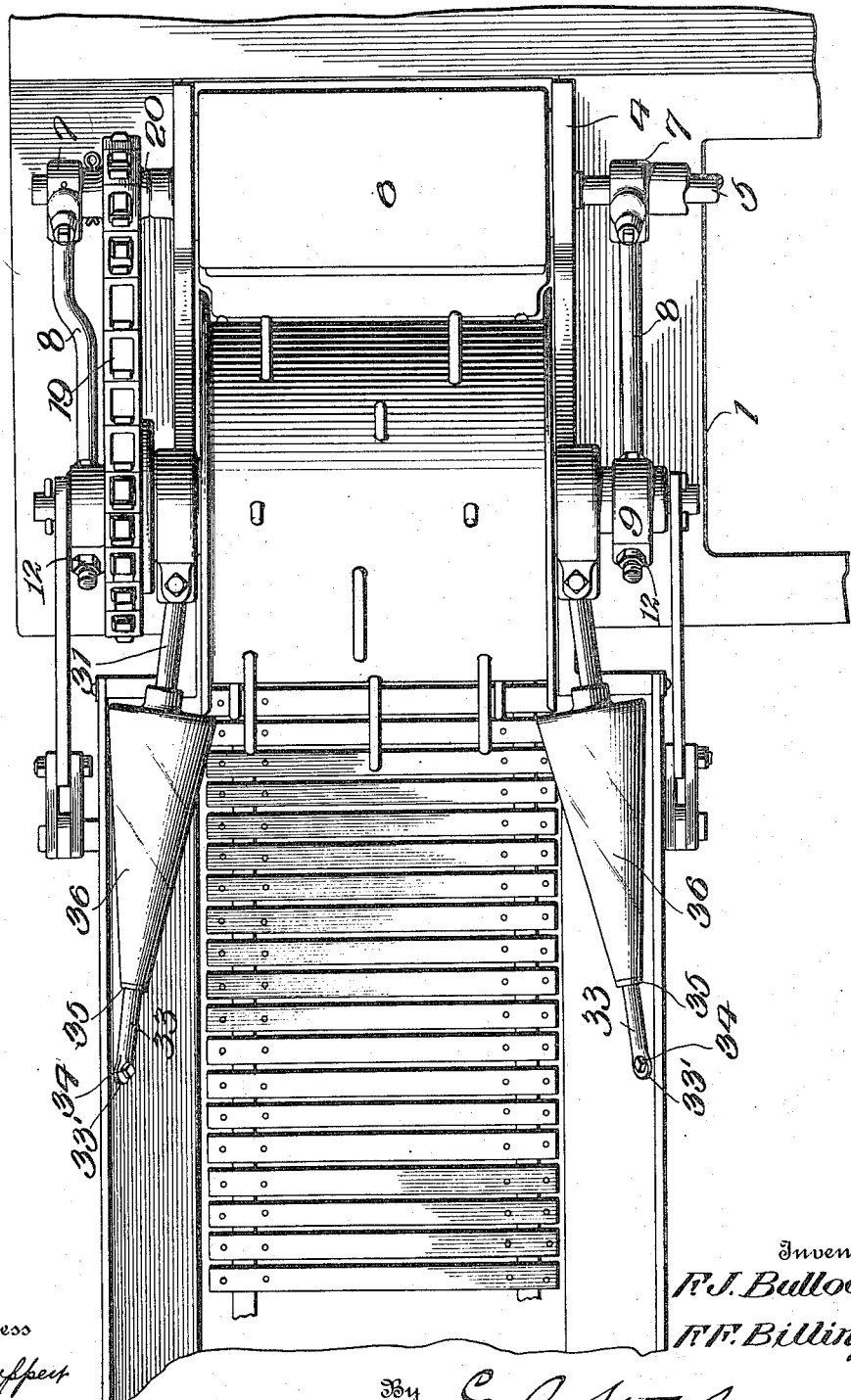

UNITED STATES PATENT OFFICE.

FRED J. BULLOCK AND FRED F. BILLINGS, OF SHORTSVILLE, NEW YORK, ASSIGNORS TO PAPEC MACHINE COMPANY, OF SHORTSVILLE, NEW YORK, A CORPORATION OF NEW YORK.

FEEDING MECHANISM FOR ENSILAGE-CUTTERS.

1,168,932.  Specification of Letters Patent.  Patented Jan. 18, 1916.

Application filed October 25, 1915.  Serial No. 57,883.

*To all whom it may concern:*

Be it known that we, FRED J. BULLOCK and FRED F. BILLINGS, citizens of the United States, residing at Shortsville, in the county of Ontario and State of New York, have invented certain new and useful Improvements in Feeding Mechanism for Ensilage-Cutters, of which the following is a specification, reference being had therein to the accompanying drawing.

This invention relates to certain new and useful improvements in feeding mechanism for ensilage cutters; the object being to provide a feeding mechanism which is so mounted that the same is self-adjusting, in order to facilitate the feeding of any stringy forage crops to the cutter of the machine.

Another object of our invention is to provide a feeding mechanism in which a rotary drum is employed having a plurality of feeding fingers adapted to be moved forwardly so as to engage the material in the feed trough and to recede as the material advances toward the usual feed rollers employed.

Another and further object of the invention is to provide in connection with the rotary drum, a pair of conical guide rollers so mounted, that the material extending over the sides of the trough and being carried forward by the endless conveyer of the trough is guided into the trough and under the feed roller.

Another and further object of our invention is to provide an exceedingly simple means for mounting the feed drum in the feed trough so as to allow the same to adjust itself to the amount of material passing thereunder, thereby preventing the feeding mechanism from becoming choked by over-feeding.

Another and further object of our invention is to provide a feeding mechanism which is exceedingly simple and cheap in construction and one which can be readily attached to any of the well-known forms of ensilage cutter, now in use.

Other and further objects and advantages of the invention will be hereinafter set forth and the novel features thereof defined by the appended claims.

In the drawings Figure 1, is a perspective of our improved construction of feeding mechanism showing the application of the same to an ensilage cutter; Fig. 2, is a detail top plan view partly in section, showing the manner of mounting the feed drum; and Fig. 3, is a top plan view of the feeding mechanism showing the manner of driving the same through the medium of a chain from the ordinary feed rollers.

Like numerals of reference refer to like parts in the several figures of the drawings.

In the drawings, 1 indicates the usual frame of an ensilage cutter; 2 the feed trough thereof, which is provided with the usual endless conveyer 3 for conveying the material to the rotary cutters. The trough is provided with an enlargement 4 adjacent the cutters having vertical guide-ways in which is mounted the usual bearings for the shaft 5 of the feed roller 6, said shaft being driven by the usual driving mechanism. The above description is given so that the operation of our improved mechanism can be readily understood.

Mounted on the shaft 5 to each side of the trough is a collar 7 carrying rods 8 which extend through the apertured lugs of a split sleeve 9 in which are mounted the trunnions 10 of a crank shaft 11; said shaft being fixed in its adjusted position within the sleeves 9 by nuts 12 mounted upon the threaded end of the rods 8 so as to clamp the trunnions of the crank shaft firmly in the sleeves 9; said collars forming a support for the crank shaft.

The crank shaft 11 is inclosed by a drum 13 having flanged heads 14 provided with bearing hubs 15 mounted upon the trunnions 10 so as to rotate freely thereon; one of said bearing hubs being provided with a flange 16 to which is secured by bolts 17, a sprocket wheel 18 over which passes a sprocket chain 19 carried by a sprocket wheel 20 fixed on the shaft 5 of the feed roller 6 so that when the feed roller is rotated by the usual driving means, the drum will also be rotated.

The peripheral wall of the drum 13 is provided with a plurality of staggeredly arranged openings 21 through which extend feeding fingers 22 provided with bearing sleeves 23 mounted upon the crank 11 within the drum; said fingers working loosely through the openings 21 so that as the drum is rotated, the fingers will be forced outwardly so as to engage the material in the trough and as the same continues to rotate, the fingers will recede so as to release the material as the material is advanced toward the usual feed rollers.

The collars 7 are loosely mounted on the shaft 5 so as to allow the drum to move vertically to accommodate the amount of material passing under the same and in order to provide additional movable supports for the trunnions carrying the drum, we arrange brackets 23 under the trough in which is arranged a shaft 24 having its ends projecting outwardly to each side of the trough and on each of which is pivotally mounted, a supporting bar 26 having an angled end 27 provided with an aperture to receive a trunnion 10, said bars being secured in position upon the trunnions by cotter pins 28, as clearly shown in the drawings.

The supports for the trunnions are adjusted so as to allow the minimum amount of material to pass under the feed drum so that when an additional amount of material is fed under the drum, the same will be raised, the rods 8 and the bars 26 swinging on their pivots, so as to allow the trunnions to move vertically, thereby preventing the same from becoming choked by the feeding of too much material into the cutter, and after the extra amount of material has passed under the drum, the drum will return by gravity to its original position.

In order to provide means for guiding the material to the rotary feeding drum, we arrange on each of the bearing sleeves 15, a collar 29 which is provided with a laterally projecting lug 30 having a longitudinal bore intersected by a transverse bore in which is loosely mounted the upper end of a tubular shaft 31 which is provided with a suitable aperture at its upper end through which a bolt 32 passes for securing the shaft within the opening of the lug; said shaft extending downwardly into the trough and is provided with a bearing collar 35 at its lower end for limiting the downward movement of a conical guide-roller 36 loosely mounted upon the shaft; said conical guide-roller extending inwardly into the trough beyond the flange 14 of the drum so that as the material is crowded into the feeding trough, it will be guided under the rotary drum.

In order to provide means for supporting the lower end of the tubular shaft 31 so that the conical guide-roller can rise with the rotary drum, we provide a shaft 33 which is slidably mounted within the tubular shaft and is provided with a flattened end 33' through which a suitable bolt 34 passes for securing the end to the side of the trough, as clearly shown in Figs. 1 and 3.

As the drum is raised by the material passing under the same, the shaft 33 slides within the hollow or tubular shaft 31 so as to allow the conical guide-rollers to move with the drum and after the extra amount of material has passed under the drum, the conical guide-rollers and drum, return to their original positions.

From the foregoing description, it will be seen that we have provided a feeding mechanism for ensilage cutters in which a rotary feeding drum is employed supported upon pivoted members so as to allow the same to move vertically and provided with a plurality of feeding fingers mounted eccentrically within the same so that they will be advanced to engage the material and will recede as the material passes thereunder, means being provided for guiding the material between the flanges of the drum.

We claim:

1. In a feeding mechanism for ensilage cutters, the combination with a revolubly mounted feeding drum, of movable supports for said drum, obliquely arranged shafts loosely connected to said drum, and conical guide rollers revolubly mounted upon said shafts.

2. In an ensilage cutter, the combination with the feed trough and feed rollers thereof, of a movably mounted rotating flanged feeding drum, and conical revolubly mounted guide rollers disposed obliquely within said trough projecting inwardly beyond the flanges of said drum.

3. In an ensilage cutter, the combination with the feed trough and feed roller therefor, of collars carried by the shaft of the feed roller, rods carried by said collars, collars carried by said rods, trunnions mounted in said collars, a crank shaft carried by said trunnions, a rotating feed drum mounted upon said trunnions provided with peripheral openings, and fingers loosely mounted upon said crank shaft within said drum and projecting outwardly through said openings.

4. A feeding mechanism for ensilage cutters, comprising a revolubly mounted feeding drum, movable supports for said drum, and movably mounted revoluble guide rollers disposed obliquely within the trough and having a connection with said drum for moving vertically therewith.

5. In an ensilage cutter, the combination with the feed trough thereof, of a movably mounted rotating feed drum, and movably mounted rotating guide rollers disposed within said trough having their peripheral edges extending inwardly beyond the edges of said drum.

6. In an ensilage cutter, the combination with the feed trough and feed roll therefor, of a shaft for supporting said feed roller, collars pivotally mounted upon said shaft, rods carried by said collars, collars carried by the free ends of said rods, trunnions fixed in said last-mentioned collars, a drum provided with bearing hubs mounted upon said trunnions, collars loosely mounted upon said bearing hubs, and shafts pivotally connected to said trough having a loose connection with said last-mentioned collars, said shafts carrying conical guide rollers.

7. In a feeding mechanism, the combination with a revoluble feeding drum provided with bearing hubs, of trunnions arranged within said hubs, movable supporting members connected to said trunnions, and feeding fingers projecting outwardly from said drum.

8. In an ensilage cutter, the combination with the feed trough thereof, of shafts pivotally connected to the sides thereof, guide rollers loosely mounted upon said shafts, a revoluble feeding drum provided with bearing hubs, collars carried by said bearing hubs, a loose connection between said shafts and collars, trunnions arranged within said bearing hubs, and movable supports for said trunnions.

9. A feeding mechanism for ensilage cutters, comprising a revolubly mounted drum, movable supports for said drum, tubular shafts loosely connected to said drum, conical guide rollers revolubly mounted upon said shafts, and pivoted shafts slidably mounted within said tubular shafts.

10. A feeding mechanism for ensilage cutters, comprising a revolubly mounted feed drum provided with hubs, trunnions arranged within said hubs, pivoted members for supporting said trunnions, pivoted shafts having a connection with said hubs, and conical guide rollers disposed on said shafts.

11. In a feeding mechanism for ensilage cutters, the combination with the feed trough thereof having a feed roller and a supporting shaft for said roller, of movable supports mounted upon said shaft, trunnions carried by said supports, a drum provided with bearing hubs mounted upon said trunnions, and movable guide rollers disposed within said trough, having a loose connection with said bearing hubs.

12. In an ensilage cutter, the combination with the feed trough thereof, of a transverse shaft disposed below said trough, links carried by said shafts, supporting bars carried by said links, trunnions arranged within said supporting bars, a revoluble feeding drum provided with bearings mounted upon said trunnions, collars loosely mounted upon said bearings, shafts pivotally connected to said feed trough at their lower ends and having their upper ends loosely connected to said collars, and conical guide rollers loosely mounted upon said shafts.

13. In an ensilage cutter, the combination with the feed trough thereof, of a feeding drum disposed within said trough having flanged heads and provided with bearing hubs, trunnions disposed within said bearing hubs, pivoted movable supports for said trunnions, collars loosely mounted upon said bearing hubs, shafts loosely connected to said collars, means for pivotally connecting said shafts to said feed trough, and conical guide rollers disposed upon said shafts and projecting inwardly beyond the flanged heads of said drum.

14. In a feeding mechanism for ensilage cutters, the combination with the feed trough thereof, of a revolubly mounted drum movably supported within said trough, and a movably mounted revoluble guide roller disposed within said trough at each side thereof in advance of said drum, having a connection with said movable drum for moving vertically therewith.

15. A feeding mechanism for ensilage cutters, comprising a revolubly mounted drum having movably mounted feeding fingers, means for revolving said drum, supporting bars for movably supporting said drum, and guide rollers disposed in advance of said drum.

16. In an ensilage cutter, the combination with the feed trough and feed roller thereof, of a shaft for supporting said feed roller, movable supports pivotally mounted upon said shaft, trunnions carried by said supports, a drum provided with bearing hubs mounted upon said trunnions, a sprocket wheel fixed on said feed roller shaft, a sprocket wheel fixed to one of the bearing hubs of said drum, and a sprocket chain passing over said sprockets for rotating said drum and feed roller in unison.

17. In an ensilage cutter, the combination with the feed trough thereof, of a revoluble drum disposed within the trough having movably mounted feeding fingers, means for movably supporting said drum within said trough, shafts pivotally connected to said trough, means for loosely connecting said shafts to said drum, and conical guide rollers revolubly mounted upon said shafts.

18. In a feeding mechanism, the combination with a rotary feeding drum having bearing hubs, of means for movably supporting said bearing hubs, collars loosely mounted upon said bearing hubs, shafts loosely connected to said collars, and guide rollers loosely mounted upon said shafts.

19. In a feeding mechanism, the combination with pivoted rods, of split collars carried by said rods, trunnions fixed within said collars, a drum provided with bearing hubs loosely mounted upon said trunnions, and means for rotating said drum.

20. In a feeding mechanism for ensilage cutters, the combination with a rotary drum provided with bearing hubs, collars carried by said hubs, tubular shafts loosely connected to said collars, conical guide-rollers carried by said tubular shafts, and shafts slidably mounted within said tubular shafts connected to the feed trough of said cutter.

21. A feeding mechanism for ensilage cutters, comprising a revolubly mounted feeding drum, movable supports for said drum, guide rollers disposed obliquely within the trough thereof, movable supports for said guide rollers, and means for connecting the guide roller supports to the feeding drum.

22. A feeding mechanism for ensilage cutters, comprising a revolubly mounted feeding drum, movable supports for said drum, a telescopic shaft disposed obliquely within the trough at each side thereof having a connection with said drum at one end and a connection with said trough at its opposite end, and a guide roller revolubly mounted on each of said shafts.

23. In an ensilage cutter, the combination with a revoluble feeding drum, pivoted supports for said drum, means for revolving said drum, shafts carried by said drum, and guide rollers revolubly mounted upon said shafts.

In testimony whereof we hereunto affix our signatures in the presence of two witnesses.

FRED J. BULLOCK.
FRED F. BILLINGS.

Witnesses:
EZRA G. SMITH,
FLORENCE A. WARNER.